US012799984B2

(12) United States Patent
Nakano et al.

(10) Patent No.: US 12,799,984 B2
(45) Date of Patent: Nov. 17, 2026

(54) BALL ARRANGEMENT METHOD FOR BALL BEARING, MANUFACTURING METHOD AND MANUFACTURING DEVICE FOR BALL BEARING, AND MANUFACTURING METHOD FOR MACHINE AND VEHICLE

(71) Applicant: NSK LTD., Tokyo (JP)

(72) Inventors: Makoto Nakano, Kanagawa (JP); Kohei Dobashi, Kanagawa (JP)

(73) Assignee: NSK LTD., Tokyo (JP)

(*) Notice: Subject to any disclaimer, the term of this patent is extended or adjusted under 35 U.S.C. 154(b) by 47 days.

(21) Appl. No.: 18/864,323

(22) PCT Filed: Feb. 21, 2023

(86) PCT No.: PCT/JP2023/006162

§ 371 (c)(1),
(2) Date: Jul. 1, 2025

(87) PCT Pub. No.: WO2023/243148

PCT Pub. Date: Dec. 21, 2023

(65) Prior Publication Data

US 2025/0341235 A1 Nov. 6, 2025

(30) Foreign Application Priority Data

Jun. 17, 2022 (JP) ................................. 2022-098114

(51) Int. Cl.
*F16C 43/06* (2006.01)

(52) U.S. Cl.
CPC .................................... *F16C 43/06* (2013.01)

(58) Field of Classification Search
CPC ........ B23P 19/04; B23P 15/003; F16C 43/06; F16C 19/06; F16C 33/00; F16C 35/067; F16C 35/07
See application file for complete search history.

(56) References Cited

U.S. PATENT DOCUMENTS 5,421,088 A * 6/1995 Kawamura ............. F16C 43/06 384/450
5,678,310 A * 10/1997 Chiba ..................... F16C 19/06 29/898.061

(Continued)

FOREIGN PATENT DOCUMENTS

CN 201526615 U 7/2010
CN 206386402 U 8/2017

(Continued)

OTHER PUBLICATIONS

International Search Report (PCT/ISA/210) issued May 16, 2023 by the International Searching Authority in International Patent Application No. PCT/JP2023/006162.

(Continued)

*Primary Examiner* — Sarang Afzali
*Assistant Examiner* — Darrell C Ford
(74) *Attorney, Agent, or Firm* — Sughrue Mion, PLLC

(57) ABSTRACT

A ball arrangement method for a ball bearing includes following steps executed in order: a ball insertion step of inserting a plurality of balls in one region along a circumferential direction of an annular space formed between an inner ring and an outer ring; a flow stop step of disposing a flow stop jig outside the one region of the annular space in the circumferential direction to keep the plurality of inserted balls in the one region; a block dividing step of disposing a block dividing jig to divide the plurality of balls into groups in the annular space; and a ball dividing step of, from a state in which the flow stop jig and the block dividing jig are disposed in the annular space, while removing the flow stop jig and the block dividing jig from the annular space, sequentially inserting tip ends of a plurality of work arrows protruded in accordance with the number of balls between the plurality of balls in an axial direction to arrange the (Continued)

plurality of balls at equal intervals in the circumferential direction.

6 Claims, 13 Drawing Sheets

(56) References Cited

U.S. PATENT DOCUMENTS

| | | | | |
|---|---|---|---|---|
| 10,240,639 | B2 * | 3/2019 | Yanagisawa | F16C 43/06 |
| 2019/0040913 | A1 | 2/2019 | Yanagisawa et al. | |
| 2021/0222731 | A1 | 7/2021 | Suzuki et al. | |

FOREIGN PATENT DOCUMENTS

| | | | |
|---|---|---|---|
| CN | 109296655 | A | 2/2019 |
| JP | 2008-200789 | A | 9/2008 |
| JP | 2014-233827 | A | 12/2014 |
| JP | 2019-209475 | A | 12/2019 |
| JP | 2021-124141 | A | 8/2021 |
| WO | 2018/128174 | A1 | 7/2018 |
| WO | 2019/230023 | A1 | 12/2019 |

OTHER PUBLICATIONS

Written Opinion (PCT/ISA/237) issued May 16, 2023 by the International Searching Authority in International Patent Application No. PCT/JP2023/006162.

Search Report issued Oct. 16, 2024 by the European Patent Office in European Patent Application No. 23783705.9.

* cited by examiner

BALL ARRANGEMENT METHOD FOR BALL BEARING, MANUFACTURING METHOD AND MANUFACTURING DEVICE FOR BALL BEARING, AND MANUFACTURING METHOD FOR MACHINE AND VEHICLE

CROSS-REFERENCE TO RELATED APPLICATIONS

This application is a National Phase Entry of PCT International Application No. PCT/JP2023/006162 filed on Feb. 21, 2023, which claims priority to Japanese Patent Application No. 2022-098114 filed on Jun. 17, 2022, the contents of all of which are incorporated herein by reference in their entirety.

TECHNICAL FIELD

The present invention relates to a ball arrangement method for a ball bearing, a manufacturing method and a manufacturing device for a ball bearing, and a manufacturing method for a machine and a vehicle.

BACKGROUND ART

As one of methods for producing (assembling) a product including a plurality of components such as bearings, there is a production technique such as a transfer machine, in which a large number of processing positions are provided, processing (assembly work) performed at one processing position is reduced, and products are successively conveyed to a downstream processing position. As an example of such a production technique, there is a method of arranging a plurality of balls at equal intervals between an inner ring and an outer ring of a ball bearing.

In the ball arranging technique described above, a ball collecting step of collecting a plurality of balls accommodated between the inner ring and the outer ring in one region in a circumferential direction is performed between a ball insertion step of inserting balls between the inner ring and the outer ring and a ball dividing step of arranging the balls at equal intervals in the circumferential direction. For this reason, a ball rubbing motion that occurs at the time of the ball collecting step is the cause of occurrence of ball damage.

On the other hand, Patent Literature 1 discloses a technique for manufacturing a ball bearing in which a ball collecting step is eliminated by holding balls after a ball insertion step in the ball bearing in one region between an inner ring and an outer ring instead of being scattered, and it is possible to shift from the ball insertion step to the ball dividing step at the same position by changing the tilt of the entire facility.

CITATION LIST

Patent Literature

Patent Literature 1: JP2019-209475A

SUMMARY OF INVENTION

Technical Problem

In the configuration of Patent Literature 1 described above, a tilting operation function is provided to control a tilt angle of the entire manufacturing device. Accordingly, it is possible to process, at one position, the ball insertion step and the ball dividing step in which tilt angles of a conveying surface are different. Therefore, after the ball insertion step, the balls are held in one region between the inner ring and the outer ring without being scattered, and then by sequentially inserting tip ends of a plurality of work arrows corresponding to the number of balls in an axial direction, the plurality of balls can be arranged at equal intervals in the circumferential direction. However, in a case of a ball bearing having a large number of balls, there is a problem that work arrows for separating the balls are elongated, lowered in rigidity, and easily bent, and thus friction, deformation, and the like are likely to occur due to rubbing between the members.

Therefore, it is an object of the present invention to provide a ball arrangement method for a ball bearing, a manufacturing method and a manufacturing device for a ball bearing, and a manufacturing method for a machine and a vehicle, which are capable of reducing friction, deformation, and the like of a member so as to prevent occurrence of ball damage, are compatible with a ball bearing having a large number of balls, and can shorten a tact time.

Solution to Problem

The present invention has the following configuration.

(1) A ball arrangement method for a ball bearing including following steps executed in order:
- a ball insertion step of inserting a plurality of balls in one region along a circumferential direction of an annular space formed between an inner ring and an outer ring;
- a flow stop step of disposing a flow stop jig outside the one region of the annular space in the circumferential direction to keep the plurality of inserted balls in the one region;
- a block dividing step of disposing a block dividing jig to divide the plurality of balls into groups in the annular space; and
- a ball dividing step of, from a state in which the flow stop jig and the block dividing jig are disposed in the annular space, while removing the flow stop jig and the block dividing jig from the annular space, sequentially inserting tip ends of a plurality of work arrows protruded in accordance with the number of balls between the plurality of balls in an axial direction to arrange the plurality of balls at equal intervals in the circumferential direction.

(2) The ball arrangement method for a ball bearing according to (1), in which in the ball insertion step, the inner ring is moved to a side opposite to the one region with respect to the outer ring, and the annular space is expanded in a radial direction in the one region to load the balls.

(3) The ball arrangement method for a ball bearing according to (1) or (2), in which in the flow stop step, the flow stop jig is inserted into the annular space along an axial direction of the inner ring and the outer ring, and in the block dividing step, the block dividing jig is inserted into the annular space along the axial direction of the inner ring and the outer ring.

(4) The ball arrangement method for a ball bearing according to any one of (1) to (3), in which in the ball insertion step, the inner ring and the outer ring are tilted with the one region upward from a horizontal plane.

(5) The ball arrangement method for a ball bearing according to any one of (1) to (4), in which the ball insertion step to the ball dividing step are continuously executed without horizontally conveying the inner ring and the outer ring.

(6) A manufacturing method for a ball bearing including: manufacturing a ball bearing in which the balls are arranged at equal intervals in the annular space between the inner ring and the outer ring by the ball arrangement method according to any one of (1) to (5).

(7) A manufacturing device for a ball bearing including:
a workpiece holding table configured to hold an inner ring and an outer ring with an annular space formed between the inner ring and the outer ring;
a ball inserting portion configured to load a plurality of balls in one region along a circumferential direction of the annular space formed between the inner ring and the outer ring held by the workpiece holding table;
a flow stop and block dividing mechanism configured to movably dispose a flow stop jig outside the one region of the annular space in the circumferential direction to keep the plurality of inserted balls in the one region, and to movably dispose a block dividing jig to divide the plurality of balls into groups; and
a ball dividing portion configured to, from a state in which the flow stop jig and the block dividing jig are disposed in the annular space, when the flow stop jig and the block dividing jig are removed from the annular space, sequentially insert tip ends of a plurality of work arrows protruded in accordance with the number of balls between the plurality of balls in an axial direction to arrange the plurality of balls at equal intervals in the circumferential direction.

(8) The manufacturing device for a ball bearing according to (7), further including:
an inner ring moving mechanism configured to move the inner ring to a side opposite to the one region with respect to the outer ring to expand the annular space in a radial direction in the one region.

(9) The manufacturing device for a ball bearing according to (7) or (8), further including:
a tilting operation mechanism configured to tilt axial vertical surfaces of the inner ring and the outer ring held by the workpiece holding table.

(10) The manufacturing device for a ball bearing according to any one of (7) to (9), in which the flow stop jig and the block dividing jig are formed in a plate shape that curves along the circumferential direction of the annular space and narrows along an insertion direction into the annular space.

(11) The manufacturing device for a ball bearing according to any one of (7) to (10), in which the ball dividing portion includes a base portion formed in an annular shape, and a plurality of work arrows erected on the base portion and arranged at equal intervals in the circumferential direction, and the plurality of work arrows are arranged in a positional relationship symmetrical along a peripheral direction.

(12) The manufacturing device for a ball bearing according to (11), in which the plurality of work arrows include a reference work arrow arranged at a center of the symmetry, and a work arrow other than the reference work arrow gradually increases in axial length as a distance from the reference work arrow increases in a range close to the reference work arrow along the circumferential direction, and gradually decreases in axial length as the distance from the reference work arrow increases in a range exceeding the range.

(13) The manufacturing device for a ball bearing according to (11) or (12), in which the flow stop jig has a notch configured to accommodate the reference work arrow when disposed at a position overlapping the reference work arrow in the axial direction.

(14) A manufacturing method for a machine using the manufacturing method for a ball bearing according to (6).

(15) A manufacturing method for a vehicle using the manufacturing method for a ball bearing according to (6).

Advantageous Effects of Invention

According to the ball arrangement of a ball bearing of the present invention, friction, deformation, and the like of a member is reduced so as to prevent occurrence of ball damage, a ball bearing having a large number of balls can be dealt with, and a tact time can be shortened.

DESCRIPTION OF EMBODIMENTS

Hereinafter, an embodiment of the present invention will be described in detail with reference to the drawings.

Figure 1:
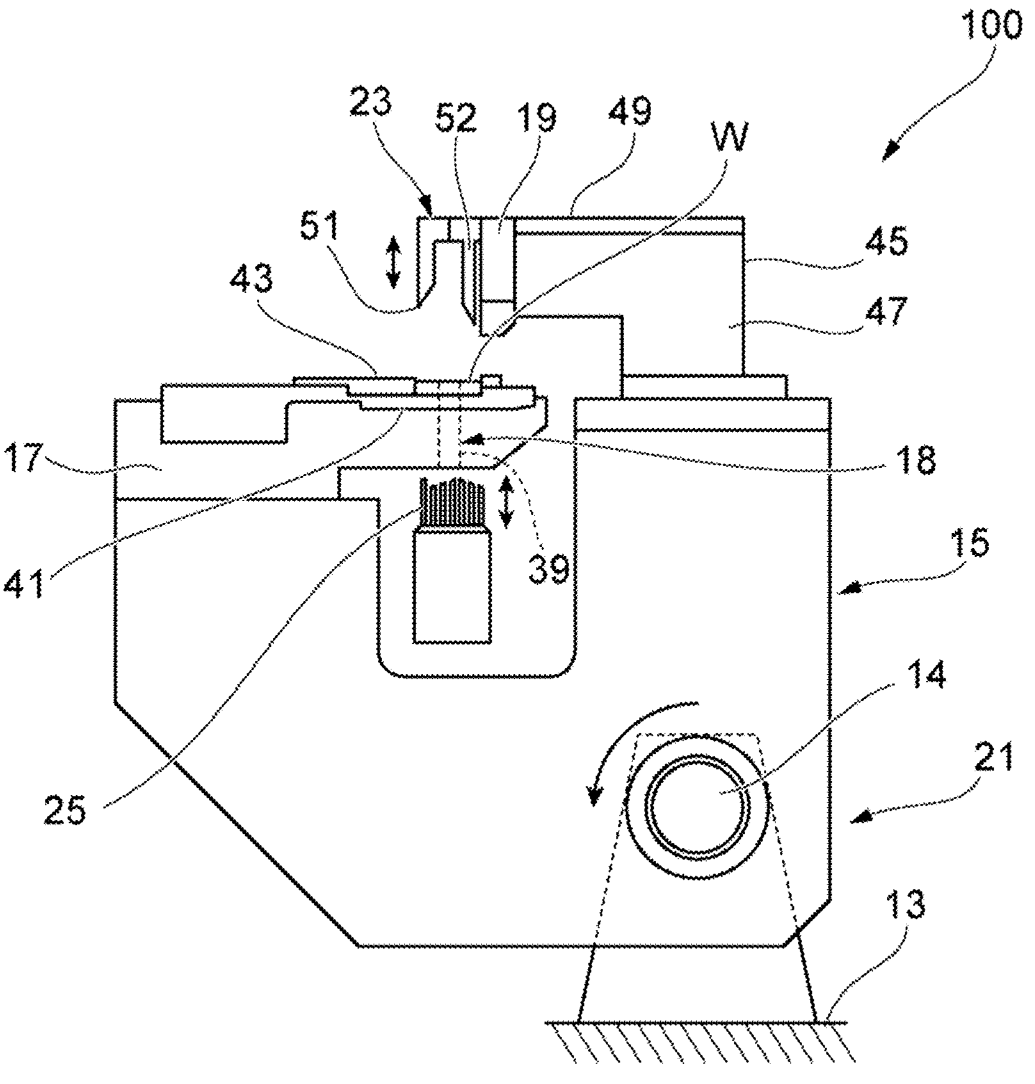
FIG. 1 is a schematic side view showing a configuration of a manufacturing device for a ball bearing according to an embodiment.
Figure 2:
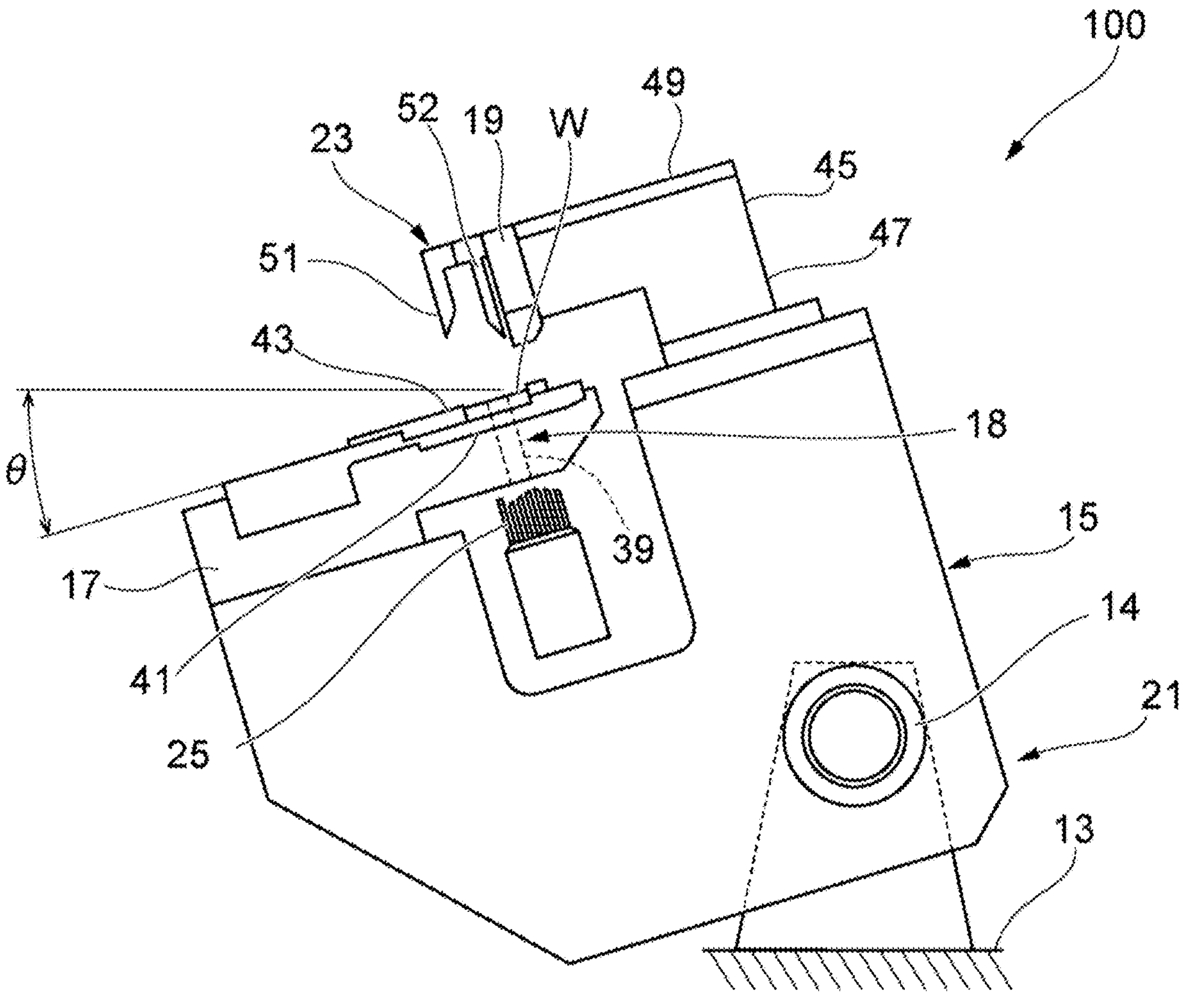
FIG. 2 is a schematic side view showing an operation of the manufacturing device for a ball bearing shown in FIG. 1.

FIG. 1 is a schematic side view showing a configuration of a manufacturing device for a ball bearing according to the embodiment. FIG. 2 is a schematic side view showing an operation of the manufacturing device for a ball bearing shown in FIG. 1.

A manufacturing device for a ball bearing 100 according to the present embodiment includes a ball arranging unit 15 installed on a base 13 via a rotation shaft 14. The ball arranging unit 15 includes a workpiece holding table 17, an inner ring moving mechanism 18, a ball inserting portion 19, a tilting operation mechanism 21, a flow stop and block dividing mechanism 23, and a ball dividing portion 25.

The ball arranging unit 15 is swung by the tilting operation mechanism 21 between a horizontal state (a state in FIG. 1) in which the workpiece holding table 17 provided at an upper portion of the ball arranging unit 15 is horizontally arranged and a tilted state (a state in FIG. 2) in which the workpiece holding table 17 is tilted at a tilt angle θ with respect to a horizontal surface.

The workpiece holding table 17 holds a workpiece W at the upper portion of the ball arranging unit 15. The workpiece holding table 17 includes a holding portion 41. The workpiece W is fitted into the holding portion 41 from above. Further, the workpiece holding table 17 is provided with a lock member 43 that moves in a direction approaching and separating from the holding portion 41. The workpiece W is fixed to the workpiece holding table 17 by being pressed by the lock member 43 in a state of being fitted into the holding portion 41.

Figure 3:
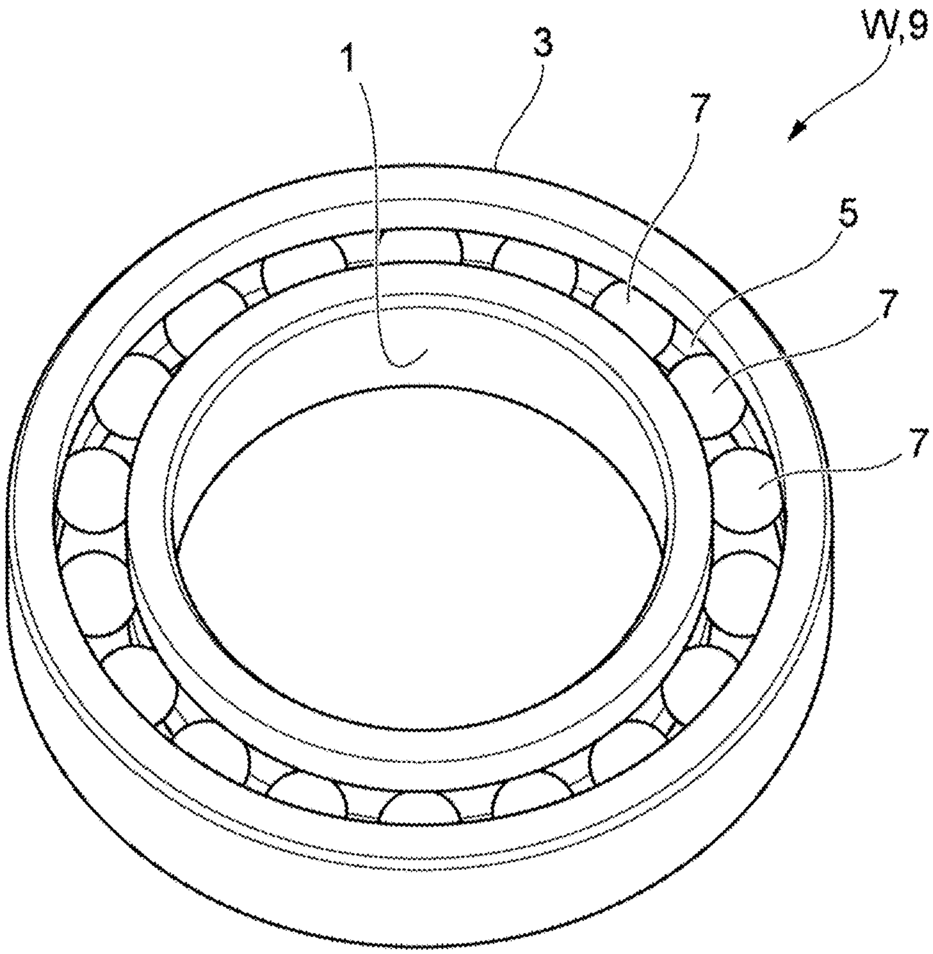
FIG. 3 is a perspective view of a workpiece that is a ball bearing.

FIG. 3 is a perspective view of a workpiece that is a ball bearing. The workpiece W includes an inner ring 1, an outer ring 3, and a plurality of (in this example, 13) balls 7 that are rolling elements. The plurality of balls 7 are arranged in a circumferential direction at equal intervals in an annular space 5 between the inner ring 1 and the outer ring 3. The balls 7 are held by a cage (not shown). That is, a ball bearing 9 is formed by assembling the workpiece W. According to the manufacturing device for a ball bearing 100 of the present configuration, the plurality of balls 7 can be inserted into the annular space 5 between the inner ring 1 and the outer ring 3, and the plurality of balls 7 can be arranged at equal intervals in the circumferential direction.

The inner ring moving mechanism 18 shown in FIGS. 1 and 2 has an inner ring support shaft 39. The inner ring support shaft 39 is fitted into the inner ring 1 of the workpiece W held by the holding portion 41 of the workpiece holding table 17 from below. The inner ring support shaft 39 is tilted together with a tilting operation of the ball arranging unit 15, and is always disposed coaxially with an axis of the workpiece W.

The ball inserting portion 19 is supported by a support portion 45 provided on an upper surface of the ball arranging unit 15. The support portion 45 includes a column portion 47 standing on the upper surface of the ball arranging unit 15 and an arm portion 49 extending from an upper end of the column portion 47 toward the workpiece holding table 17. The ball inserting portion 19 is supported by a tip end of the arm portion 49. The ball inserting portion 19 is used to insert the plurality of balls 7 into an annular space 5 (see FIG. 3) between the inner ring 1 and the outer ring 3 in the workpiece W held by the holding portion 41 of the workpiece holding table 17.

The flow stop and block dividing mechanism 23 is supported by the tip end of the arm portion 49 of the support portion 45. The flow stop and block dividing mechanism 23 includes a flow stop jig 51 and a block dividing jig 52 that move up and down with respect to the workpiece holding table 17. By being driven downward, tip end portions of the flow stop jig 51 and the block dividing jig 52 are inserted into the annular space 5 (see FIG. 3) between the inner ring 1 and the outer ring 3 in the workpiece W held by the holding portion 41 of the workpiece holding table 17.

Figure 4:
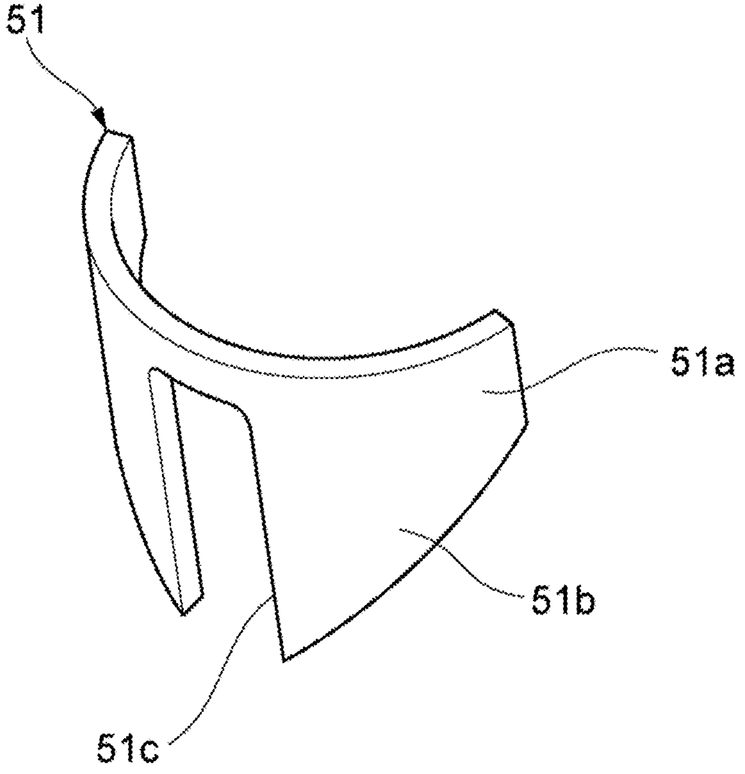
FIG. 4 is a view showing a flow stop jig.

FIG. 4 is a perspective view showing the flow stop jig 51. As shown in FIG. 4, the flow stop jig 51 is formed in a plate shape that forms a portion of a circular tubular shape curving along the circumferential direction of the annular space 5 and that narrows along an insertion direction (downward in FIG. 4) into the annular space 5.

Specifically, the flow stop jig 51 is formed by connecting a main body portion 51*a* having a partial cylindrical shape and a tapered portion 51*b* joined to a lower end of the main body portion 51*a* with the same curvature and narrowing downward from the main body portion 51*a*. A notch 51*c* extending straight from a lower end of the tapered portion 51*b* toward the main body portion 51*a* is formed.

Figure 5A:
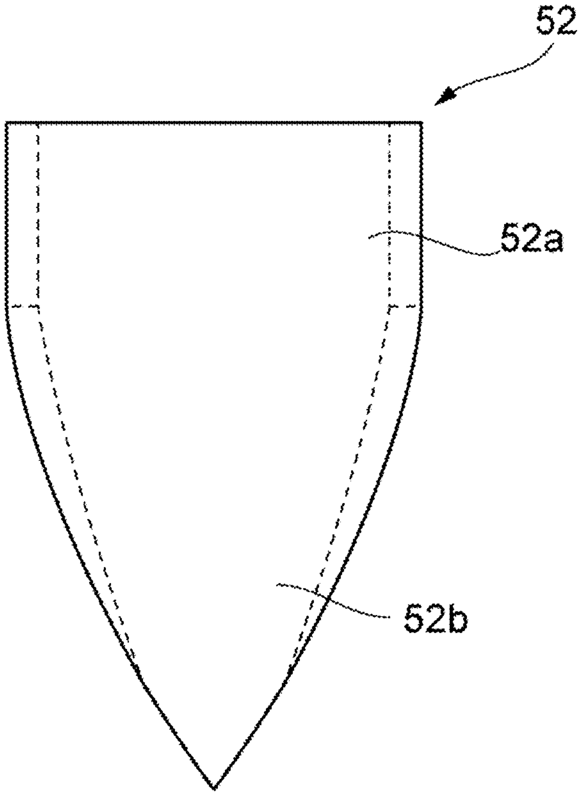
FIG. 5A is a front view of a block dividing jig.
Figure 5B:
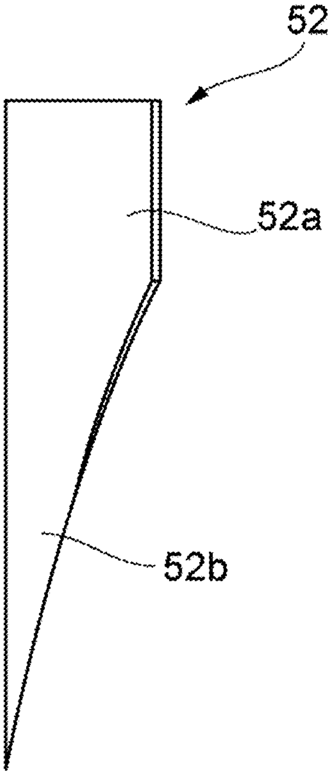
FIG. 5B is a side view of the block dividing jig.
Figure 5C:
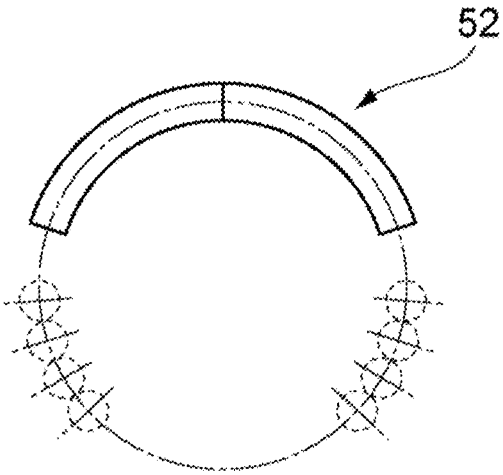
FIG. 5C is a bottom view of the block dividing jig.

FIG. 5A is a front view of the block dividing jig 52. FIG. 5B is a side view of the block dividing jig 52. FIG. 5C is a bottom view of the block dividing jig 52.

As shown in FIGS. 5A to 5C, the block dividing jig 52 is also formed in a plate shape that curves along the circumferential direction of the annular space 5 and that narrows along the insertion direction (downward in FIGS. 5A and 5B) into the annular space 5.

The block dividing jig 52 is formed by connecting a main body portion 52*a* having a partial cylindrical shape and a tapered portion 52*b* extending toward a lower end (tip end in the insertion direction) of the main body portion 52*a* with the same curvature as that of the main body portion 52*a* and narrowing toward the lower end.

It is preferable that a length of the flow stop jig 51 in an upper-lower direction is longer than a length of the block dividing jig 52 in the upper-lower direction.

Figure 6:
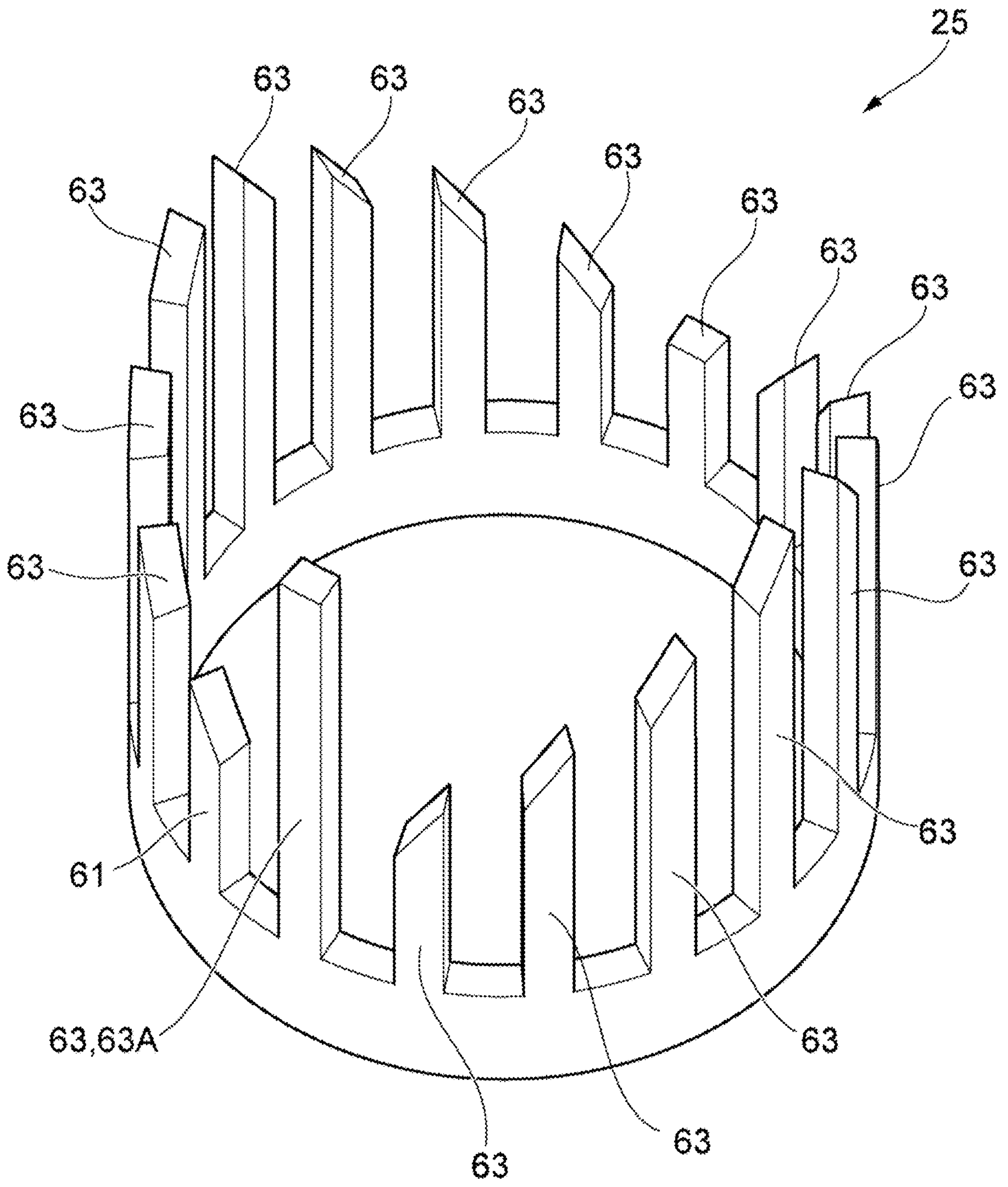
FIG. 6 is a perspective view of a ball dividing portion.

FIG. 6 is a perspective view of the ball dividing portion 25.

The ball dividing portion 25 is formed by connecting a base portion 61 formed in an annular shape and a plurality of work arrows 63 having different lengths. The work arrows 63 are erected on the base portion 61 and are arranged at equal intervals in the circumferential direction. The ball dividing portion 25 includes the same number (13 in this embodiment) of work arrows 63 as the number of balls 7. The plurality of work arrows 63 include one reference work arrow 63A. The other work arrows 63 are arranged in a positional relationship symmetrical along the circumferential direction with reference to the reference work arrow 63A. That is, around the reference work arrow 63A, the work arrows 63 having the same shape and height are arranged at corresponding circumferential positions (circumferential positions where distances from the reference work arrow 63A are equal) along one side and the other side in the circumferential direction. The reference work arrow 63A is longer than the work arrow 63 on both sides thereof. The work arrows 63, which are arranged at symmetrical positions with respect to each other along both sides of the reference work arrow 63A in the circumferential direction, gradually increase in axial length as the work arrows move away from the reference work arrow 63A within a range of ±90 degrees in central angle from the reference work arrow 63A, and gradually decrease in axial length as the work arrows move away from the reference work arrow 63A beyond the range of ±90 degrees in central angle from the reference work arrow 63A.

A tip end portion of the reference work arrow 63A has a planar shape substantially perpendicular to a protruding direction from the base portion 61. A tip end portion of the work arrow 63 arranged within ±90 degrees of the central angle from the reference work arrow 63A is an inclined surface facing the reference work arrow 63A along the circumferential direction, and a tip end portion of the work arrow 63 arranged beyond ±90 degrees of the central angle from the reference work arrow 63A is an inclined surface facing an opposite side to the reference work arrow 63A along the circumferential direction.

Each of the work arrows 63 in a symmetrical positional relationship with respect to the reference work arrow 63A preferably has a shape that is a mirror image with respect to a plane passing through the center of the reference work arrow 63A and an axis of the ball dividing portion 25, but may not necessarily be the same.

The flow stop jig 51 and the block dividing jig 52 of the flow stop and block dividing mechanism 23 and the ball dividing portion 25 are disposed in the upper-lower direction with the workpiece W held by the holding portion 41 of the workpiece holding table 17 sandwiched therebetween. In the example shown in FIGS. 1 and 2, the flow stop jig 51 and the block dividing jig 52 are disposed above the workpiece W, and the ball dividing portion 25 is disposed below the workpiece W. In the tilted state (the state in FIG. 2) in which the workpiece holding table 17 is tilted by the tilting operation mechanism 21, the reference work arrow 63A of the ball dividing portion 25 is disposed so as to be on a lower side of the tilt of the workpiece W. The ball dividing portion 25 may be disposed above the workpiece W, and the flow stop jig 51 and the block dividing jig 52 may be disposed below the workpiece W.

Figure 7:
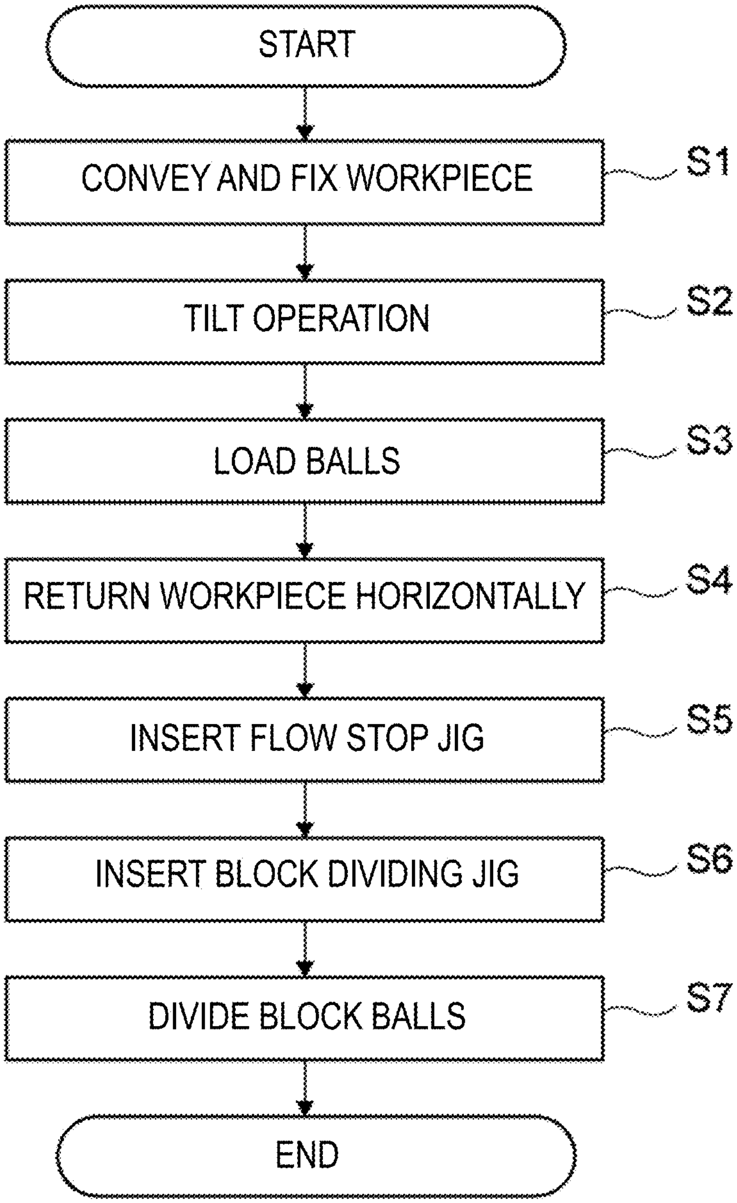
FIG. 7 is a flowchart illustrating ball arrangement work.

Next, a case where a ball bearing is manufactured by inserting balls into the workpiece W by the manufacturing device for a ball bearing 100 described above will be described by steps along the flowchart shown in FIG. 7.

Workpiece Fixing Step

The conveyed work W is held by the holding portion 41 of the workpiece holding table 17 with respect to the ball arranging unit 15 in the horizontal state (step S1). At this time, the inner ring 1 is supported by the inner ring support shaft 39 inserted into an inner circumference thereof, and the outer ring 3 is fixed to the holding portion 41 by the lock member 43.

Tilting Operation Step

The tilting operation mechanism 21 turns the ball arranging unit 15 into the tilted state in which the workpiece holding table 17 is tilted at the tilt angle θ with respect to the horizontal surface (step S2). At this time, the inner ring support shaft 39 of the inner ring moving mechanism 18 is tilted together with the tilting operation of the ball arranging unit 15. Further, a central axis of the inner ring support shaft 39 of the inner ring moving mechanism 18 is disposed at a position displaced to a lower side (left side in FIG. 2) of the tilt in a plane orthogonal to a central axis of the workpiece W. In this way, the center of the inner ring 1 is eccentric to the lower side of the tilt with respect to the center of the outer ring 3. Accordingly, the annular space 5 between the inner ring 1 and the outer ring 3 narrows on the lower side of the tilt and widens in a radial direction in a region on an upper side of the tilt (see FIG. 8A).

Ball Insertion Step

Figure 8A:
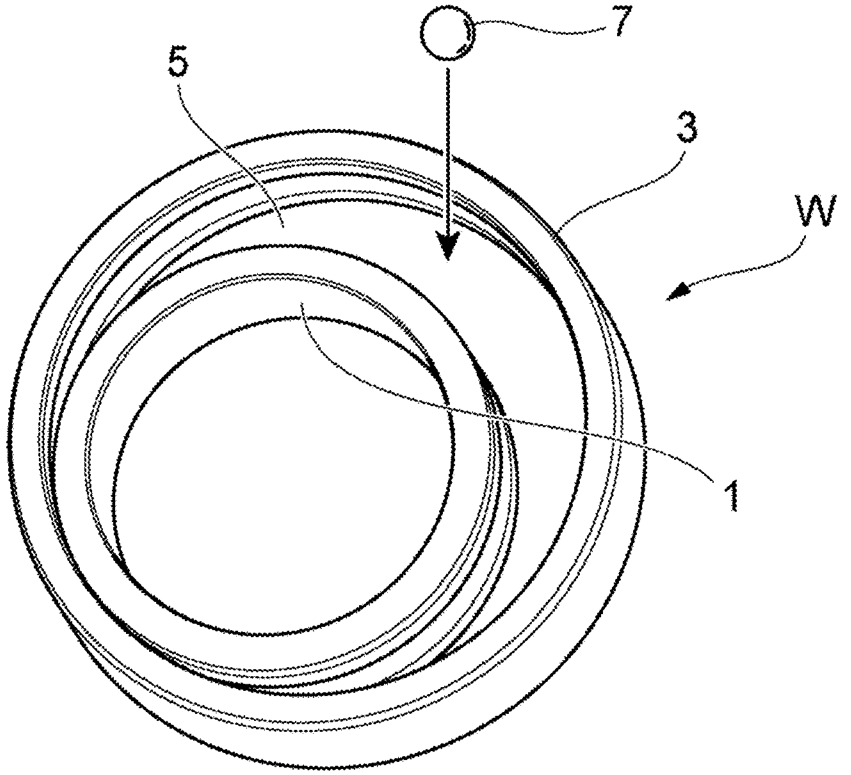
FIG. 8A is a view illustrating a ball insertion step, and is a perspective view of the workpiece before a ball is inserted.
Figure 8B:
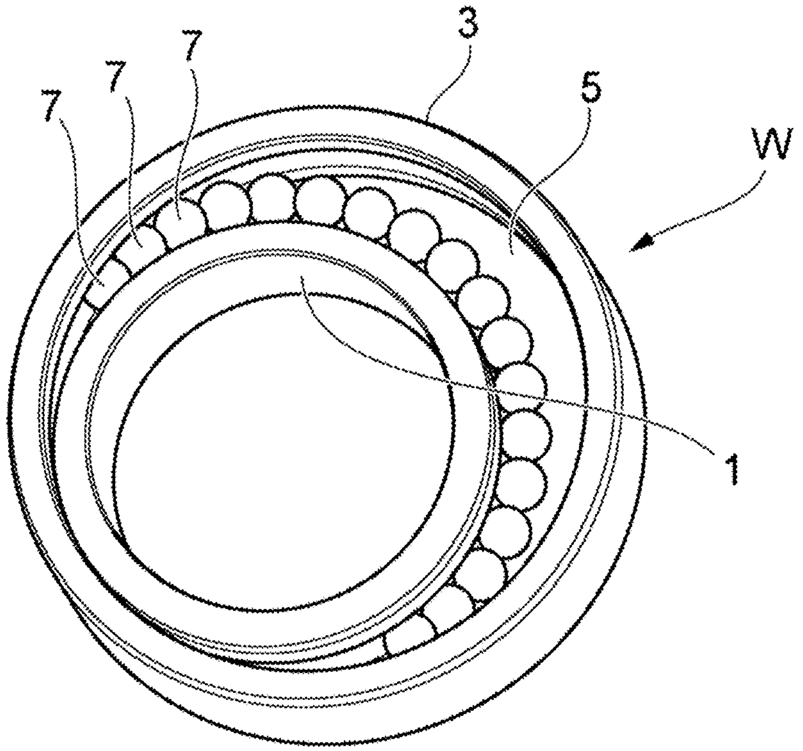
FIG. 8B is a view illustrating the ball insertion step, and is a perspective view of the workpiece after balls are inserted.

FIG. 8A is a view illustrating the ball insertion step, and is a perspective view of the workpiece before a ball is inserted. FIG. 8B is a view illustrating the ball insertion step, and is a perspective view of the workpiece after the balls are inserted.

As shown in FIG. 8A, the balls 7 are inserted into the annular space 5 between the inner ring 1 and the outer ring 3 held by the workpiece holding table 17 (see FIGS. 1 and 2) from the ball inserting portion 19 (step S3). At this time, the annular space 5 is in a state where an upper side of the tilt is widened, and the balls 7 can be easily and smoothly inserted into the annular space 5 by the ball inserting portion 19. In addition, the balls 7 roll and move to the left and right due to its own weight without remaining at a inserting location. Thus, when the ball 7 is inserted, the already inserted ball 7 does not get in the way. As shown in FIG. 8B, the balls 7 inserted into the annular space 5 are accommodated in a state of being collected in a widened region on the upper side of the tilt. That is, the balls 7 inserted in the annular space 5 are accommodated in a collected state in one region along the circumferential direction of the annular space 5.

Horizontal Operation Step

The tilting operation mechanism 21 turns the ball arranging unit 15 into the horizontal state (the state of FIG. 1) in which the workpiece holding table 17 is horizontal (step S4). At this time, the central axis of the inner ring support shaft 39 is moved to a position coaxial with the axis of the workpiece W. As a result, the centers of the outer ring 3 and the inner ring 1 coincide with each other, and the annular space 5 becomes a uniform gap in the circumferential direction.

Figure 9A:
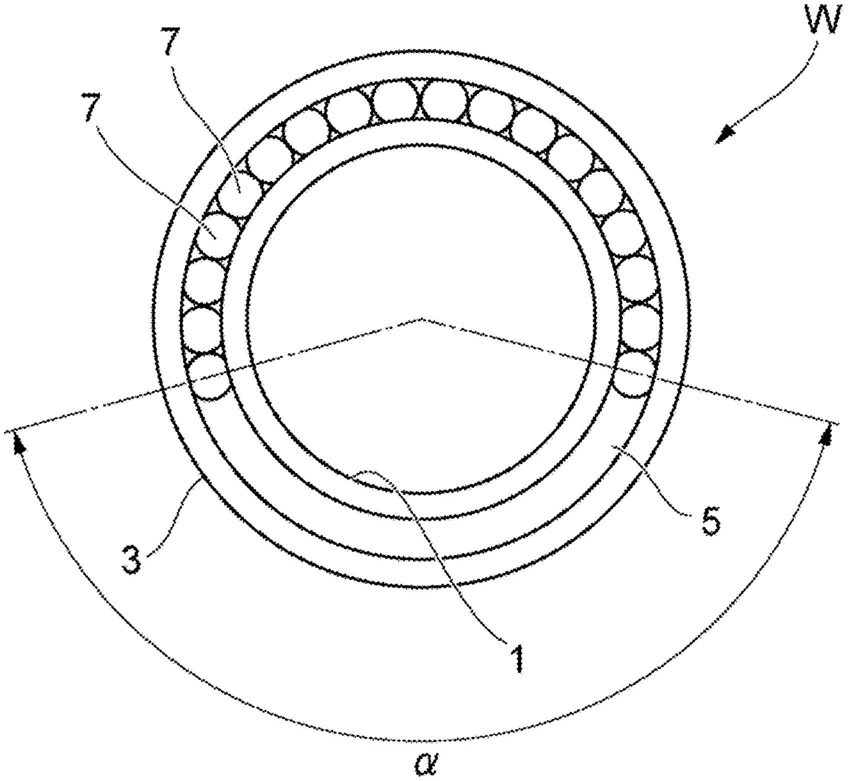
FIG. 9A is a view showing a state in which the balls are accommodated in an annular space, and is a plan view of the workpiece having no deformation allowance for holding the balls between an inner ring and an outer ring.
Figure 9B:
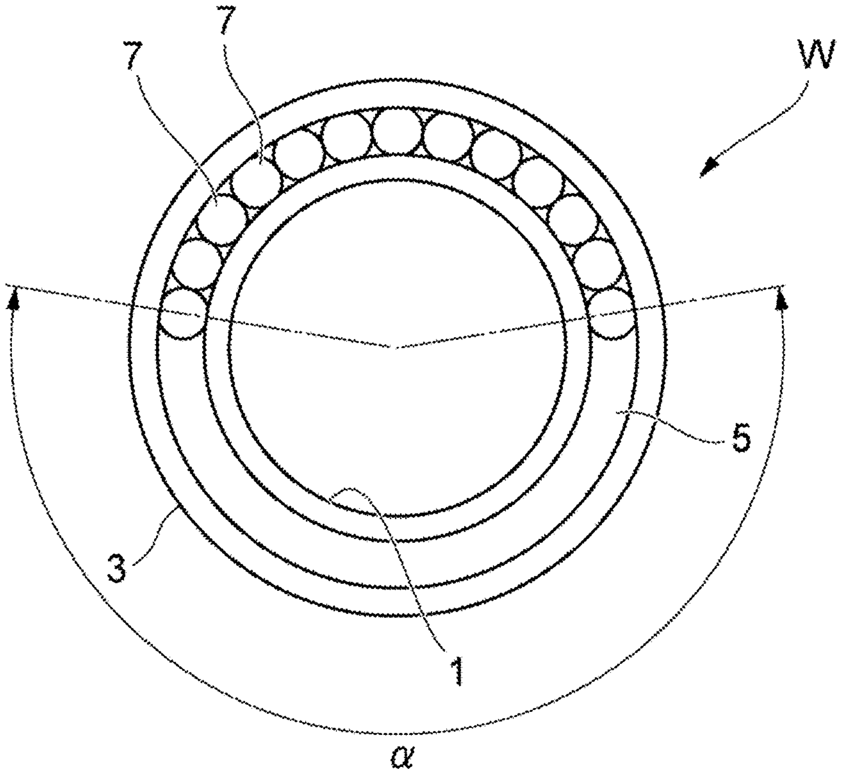
FIG. 9B is a view showing a state in which the balls are accommodated in the annular space, and is a plan view of the workpiece having a deformation allowance for holding the balls between the inner ring and the outer ring.

FIG. 9A is a view showing a state in which the balls are accommodated in the annular space, and is a plan view of the workpiece having no deformation allowance for holding the balls between the inner ring and the outer ring. FIG. 9B is a view showing a state in which the balls are accommodated in the annular space, and is a plan view of the workpiece having a deformation allowance for holding the balls between the inner ring and the outer ring.

As shown in FIG. 9A, in the annular space 5 with the uniform gap in the circumferential direction, the balls 7 are collected in one region, and the outside in the circumferential direction than the one region becomes a space without the balls 7. In a workpiece having no deformation allowance for holding the balls 7 between the inner ring 1 and the outer ring 3, a region (central angle) α of the space is in a range of 180° or more. In a case where the workpiece W has a deformation allowance for holding the balls 7 in grooves of the inner ring 1 and the outer ring 3, as shown in FIG. 9B, a region (central angle) α of the space without the balls 7 in the outside in the circumferential direction than the one region is in a range of less than 180°.

Flow Stop Step and Block Dividing Step

Figure 10A:
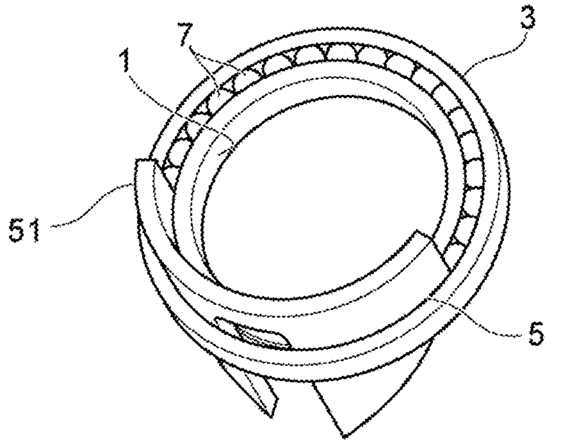
FIG. 10A is a perspective view of the workpiece, the flow stop jig, and the block dividing jig illustrating a flow stop step.
Figure 10B:
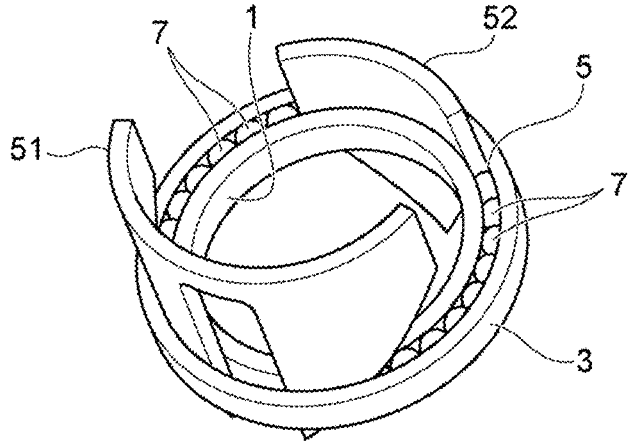
FIG. 10B is a perspective view of the workpiece, the flow stop jig, and the block dividing jig illustrating the flow stop step.
Figure 10C:
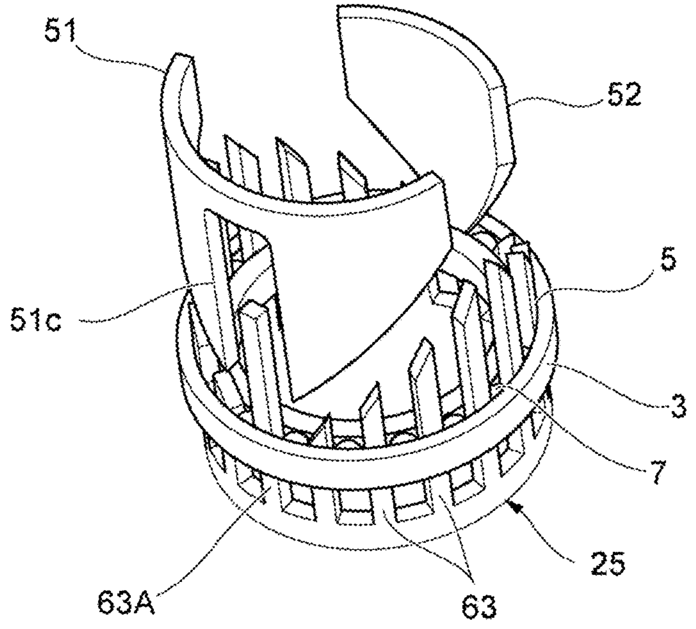
FIG. 10C is a perspective view of the workpiece, the flow stop jig, and the block dividing jig illustrating the flow stop step.

FIGS. 10A, 10B, and 10C are perspective views of the workpiece W, the flow stop jig 51, and the block dividing jig 52 illustrating the flow stop step and a block dividing step.

First, the flow stop jig 51 of the flow stop and block dividing mechanism 23 (FIG. 1) is inserted into the space without the balls 7 in the annular space 5 of the workpiece W along the axial direction of the inner ring 1 and the outer ring 3 from above (step S5). Here, when the centers of the outer ring 3 and the inner ring 1 are made to coincide with each other, the balls 7 collected in the one region can roll and move to the space without the balls 7. However, as shown in FIG. 10A, since the flow stop jig 51 is inserted into the annular space 5, the movement of the inserted balls 7 can be restricted and the balls 7 can be kept in the one region.

Thereafter, as shown in FIG. 10B, the block dividing jig 52 is inserted into the annular space 5 of the workpiece W on a side facing the flow stop jig 51 in the radial direction (step S6). At this time, at the same time as the insertion of the block dividing jig 52, the flow stop jig 51 is moved in a removing direction (the counter-insertion direction). As a result, a circumferential length of the tapered portion 52*b* of the block dividing jig 52 in the annular space 5 is increased, and a circumferential length of the tapered portion 51*b* of the flow stop jig 51 in the annular space 5 is decreased. Then, the block dividing jig 52 is allowed to be inserted into the annular space 5, and the balls 7 move in the circumferential direction while being sandwiched between the flow stop jig 51 and the block dividing jig 52. In this manner, the balls 7 are divided into two groups in the annular space 5 by the flow stop jig 51 and the block dividing jig 52.

The operation of inserting the flow stop jig 51 and the block dividing jig 52 into the annular space 5 is performed in accordance with the horizontal operation in which the ball arranging unit 15 is returned horizontally and the inner ring 1 is moved to align the centers of the outer ring 3 and the inner ring 1. The operation may be performed after the ball arranging unit 15 is made horizontally.

Block Ball Dividing Step

As shown in FIG. 10C, from the state in which the flow stop jig 51 and the block dividing jig 52 are disposed in the annular space 5, while removing the flow stop jig 51 and the block dividing jig 52 from the annular space 5, the ball dividing portion 25 is raised with respect to the workpiece W to insert the plurality of work arrows 63 into the annular space 5.

At this time, the longest work arrow 63 other than the reference work arrow 63A enters between the flow stop jig 51 and the block dividing jig 52. The flow stop jig 51 has the tapered portion 51*b* and the block dividing jig 52 has the tapered portion 52*b*, so that an upper end of the longest work arrow 63 is prevented from interfering with the flow stop jig 51 and the block dividing jig 52. On the other hand, the reference work arrow 63A enters and is accommodated in the notch 51*c* of the flow stop jig 51, so that the reference work arrow 63A does not interfere with the flow stop jig 51.

As the ball dividing portion 25 is raised, between the balls 7 arranged in the annular space 5 and divided into two groups, tip ends of the plurality of work arrows 63 protruded in accordance with the number of the balls 7 are sequentially inserted in the axial direction, and the plurality of balls 7 are arranged at equal intervals in the circumferential direction (step S7).

A raising speed of the flow stop jig 51 and the block dividing jig 52 is substantially the same as that of the ball dividing portion 25. Therefore, when the flow stop jig 51, the block dividing jig 52, and the ball dividing portion 25 are raised, a relative position of the flow stop jig 51 and the ball dividing portion 25 hardly changes. That is, the relative positions of the flow stop jig 51 and the block dividing jig 52, the ball dividing portion 25, and the balls 7 change. That is, as the flow stop jig 51 and the block dividing jig 52 are retracted, the ball dividing portion 25 enters and the work arrows 63 are allowed to enter between the balls 7.

Figure 11:
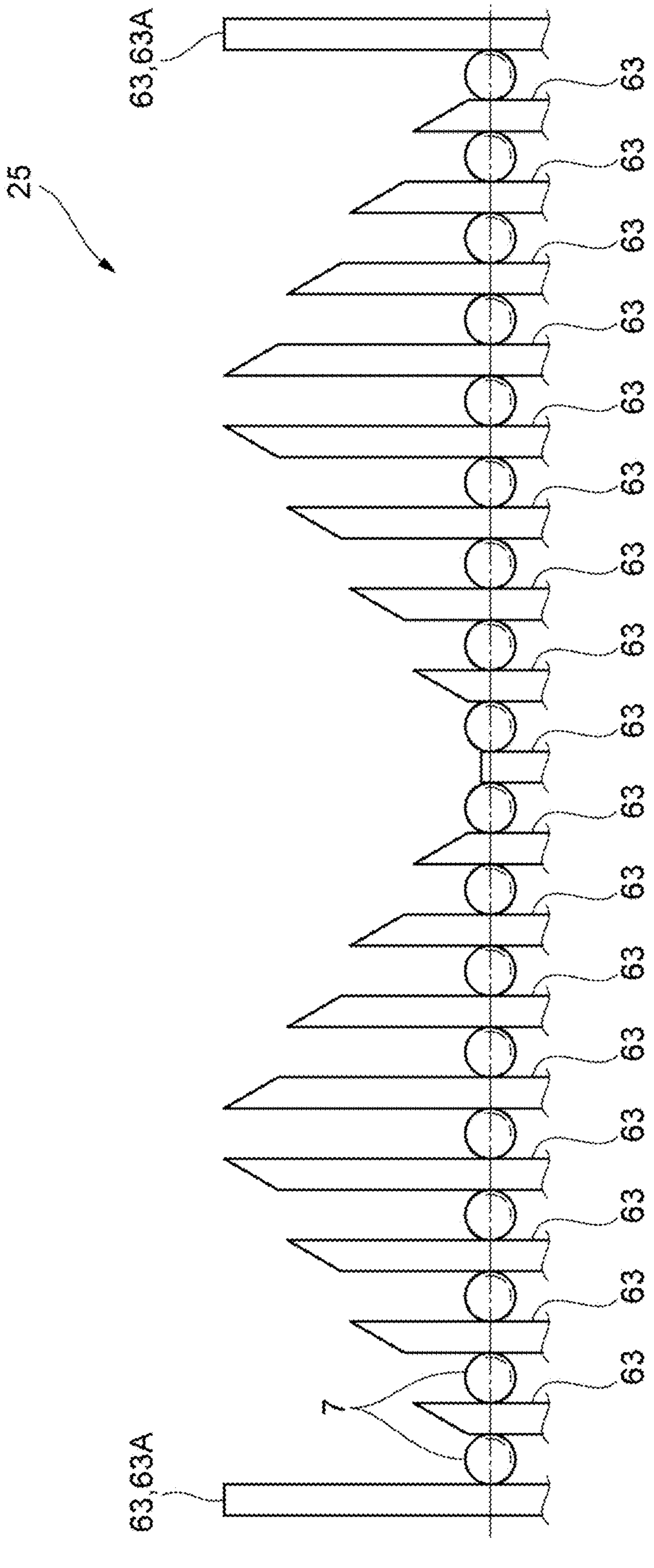
FIG. 11 is a schematic expanded view illustrating a state in which the balls are arranged by a ball dividing step.

Finally, as shown in FIG. 11, the work arrows 63 of the ball dividing portion 25 enters between the balls 7 accommodated in the annular space 5, respectively, and the plurality of balls 7 are arranged at equal intervals in the circumferential direction.

Thereafter, by fitting a cage (not shown) for holding the balls 7 into the annular space 5, a ball bearing in which the balls 7 are evenly arranged and rotatably held is provided.

As described above, the ball arrangement method for a ball bearing according to the present embodiment includes the "tilting operation" of changing the tilt angle of the entire device, the "flow stop step" of preventing the balls from scattering at the time of ball inserting, the "block dividing step" of distributing the balls to two regions from the state where the balls are collected in one region between the inner ring and the outer ring after the ball inserting, and the "block ball dividing step" of sequentially inserting the work arrows into the plurality of balls distributed to the two regions to arrange the balls at equal intervals in the circumferential direction. By the flow stop step, it is possible to shift to the ball dividing step in the state where the balls inserted between the inner ring and the outer ring are held in one location without being scattered, so that the ball collecting step in the related art becomes unnecessary.

According to the present embodiment, by executing the tilting operation step of controlling the tilt angle of the entire device, the ball insertion step and the ball dividing step in which the tilt angles of the conveying surface are different can be processed at one position without horizontally moving the inner ring and the outer ring. In addition, in order to cope with a ball bearing having a large number of balls, it is possible to distribute the balls held at one location to two regions so that the balls can be divided. This is accomplished by performing the flow stop step of preventing scattering of the balls at the time of ball inserting, thereby preventing the balls inserted between the inner ring and the outer ring from being scattered, and by performing the block dividing step of collectively distributing the balls into two regions. Thereafter, since it is possible to shift to the ball dividing step, the ball collecting step in the related art is not necessary.

Further, by eliminating the ball rubbing motion in the ball collecting step, the occurrence of ball damage is reduced, and by performing the ball dividing step from the ball insertion step at one position, there is no need to convey the ball bearings between steps.

In addition, according to the present embodiment, the problem that in the case of a ball bearing having a large number of balls, the work arrows are elongated and lowered in rigidity, and friction and deformation are likely to occur is solved. Further, it is possible to assemble a workpiece without a snap allowance by the same method. Further, the balls 7 are distributed to two regions, and the tip ends of the plurality of work arrows 63 protruded in accordance with the number of balls 7 in each region are sequentially inserted in the axial direction to arrange the plurality of balls 7 at equal intervals in the circumferential direction. As a result, it is possible to reduce abrasion and deformation of the ball dividing portion 25, and the occurrence of damage of the balls 7, and to shorten a working time.

According to the present embodiment, by eliminating the ball rubbing motion in the ball collecting step, the occurrence of ball damage can be reduced. Further, by the block dividing step and the block ball dividing step, even if the number of balls is large, the work arrows 63 can be made relatively short and highly rigid, and friction and deformation can be reduced. Further, by distributing the balls 7 into the two regions, an insertion load of the work arrow 63 can be reduced, the damage of the ball 7 and the deformation of the ball dividing portion 25 can be reduced, and a ball dividing time can be shortened.

According to the present embodiment, workability can be improved by reducing the number of man-hours for arranging the balls in the ball bearing. Further, by eliminating the ball rubbing motion in the ball collecting step, a risk of occurrence of ball damage can be reduced. In addition, by continuously performing the ball dividing step from the ball insertion step, assembling can be easily performed even for a ball bearing without a deformation allowance for holding the balls 7 between the inner ring 1 and the outer ring 3.

In addition, in the ball insertion step, the inner ring 1 is moved to the side opposite to the one region with respect to the outer ring 3, and the annular space 5 is expanded in the radial direction in the one region to load the balls 7. As a result, the balls can be smoothly inserted into the annular space 5.

In addition, in the flow stop step, the flow stop jig 51 is inserted into the annular space 5 along the axial direction of the inner ring 1 and the outer ring 3. Therefore, movement of the balls 7 collected in the one region is restricted by the flow stop jig 51, thereby preventing the balls 7 from being scattered. As a result, the plurality of balls 7 inserted into the annular space 5 can be divided while being held in one location without being scattered.

In addition, after the insertion of the flow stop jig 51, the block dividing jig 52 is inserted into the annular space 5 along the axial direction of the inner ring 1 and the outer ring 3. Thus, the plurality of balls 7 can be divided into two groups, and lengths of the work arrows 63 can be shortened. As compared with, for example, a configuration in which balls are distributed to a plurality of regions and a plurality of work arrows are inserted into each region (JP2008-200789A), by using the flow stop jig 51 and the block dividing jig 52 together, the configuration of a device such as a driving mechanism of the work arrow or the like can be greatly simplified, and the block dividing operation (work) can be significantly simplified.

In addition, in the ball insertion step, the inner ring 1 and the outer ring 3 are tilted with the one region upward from the horizontal plane. Therefore, the balls 7 inserted into the one region of the annular space 5 move downward under its own weight and are arranged in order. As a result, the ball insertion step can be smoothly performed.

Further, it is possible to continuously execute the ball insertion step to the ball dividing step without horizontally conveying the inner ring 1 and the outer ring 3. Therefore, scattering of the balls 7 during horizontal conveyance can be eliminated, and workability can be improved.

According to a manufacturing method for a ball bearing of manufacturing a ball bearing in which the balls 7 are arranged at equal intervals in the annular space 5 between the inner ring 1 and the outer ring 3, by using the ball arrangement method described above, it is possible to easily manufacture a ball bearing in which the balls 7 are arranged at equal intervals in the circumferential direction in the annular space 5 between the inner ring 1 and the outer ring 3.

Further, according to the manufacturing device for a ball bearing 100 of the present embodiment, the ball insertion step of inserting the plurality of balls 7 in one region along the circumferential direction of the annular space 5 by the ball inserting portion 19 and the ball dividing step of arranging the balls 7 at equal intervals in the circumferential direction by the work arrows 63 of the ball dividing portion 25 can be continuously performed. Thus, the ball collecting step of collecting the balls 7 inserted into the annular space 5 in the ball insertion step at one place can be omitted. Accordingly, workability can be improved by reducing the number of man-hours for arranging the balls in the ball bearing. Further, by eliminating the ball rubbing motion in the ball collecting step, the occurrence of ball damage can be reduced. In addition, by continuously performing the ball dividing step from the ball insertion step, assembling can be easily performed even for a ball bearing without a deformation allowance for holding the balls between the inner ring and the outer ring.

In addition, by moving the inner ring 1 to the side opposite to the one region with respect to the outer ring 3 by the inner ring moving mechanism 18, and expanding the annular space 5 in the radial direction in the one region, it is possible to easily load balls into the annular space 5 and further improve workability.

In addition, the tilting operation mechanism 21 tilts axial vertical surfaces of the inner ring 1 and the outer ring 3 held by the workpiece holding table 17, so that the balls 7 inserted into the one region of the annular space 5 move downward by its own weight and are arranged in this order. As a result, the ball inserting work by the ball inserting portion 19 can be smoothly performed.

Further, the flow stop jig 51 and the block dividing jig 52 are formed in a plate shape that curves along the circumferential direction of the annular space 5 and narrows along the insertion direction into the annular space 5. As a result, the movement of the balls 7 in the annular space 5 can be favorably restricted by the flow stop jig 51 and the block dividing jig 52.

Further, since the tapered portions 51*b* and 52*b* smoothly contact the balls 7 in the annular space 5 when the flow stop jig 51 and the block dividing jig 52 are inserted into and removed from the annular space 5, it is possible to prevent the occurrence of ball damage due to the contact between the flow stop jig 51 and the block dividing jig 52 and the balls 7.

As described above, the present invention is not limited to the above-described embodiments, and combinations of the respective configurations of the embodiments and changes and modifications made by those skilled in the art based on the descriptions in the description and the well-known technique are intended by the present invention and are thus also included within the scope of the present invention to be protected.

The manufacturing method for a ball bearing described above can also be applied to the manufacture of various machines (including manual powered machines) including a ball bearing. For example, the present invention can be applied to a linear motion guide device such as a rail or a slider, a ball screw device or a screw device such as a screw shaft or a nut, a linear motion device such as a device in which a linear motion guide bearing and a ball screw are combined, or an actuator such as an XY table. Further, the present invention can be applied to steering devices such as a steering column, a universal joint, an intermediate gear, a rack-and-pinion, an electric power steering device, a worm reduction gear, and a torque sensor. The present invention can be widely applied to vehicles including the machine, a steering device, and the like, machine tools, household appliances, and the like. According to the machine, the vehicle, and the like obtained by this method, it is possible to achieve a high-quality configuration at a lower cost than in the related art.

Figure 12:
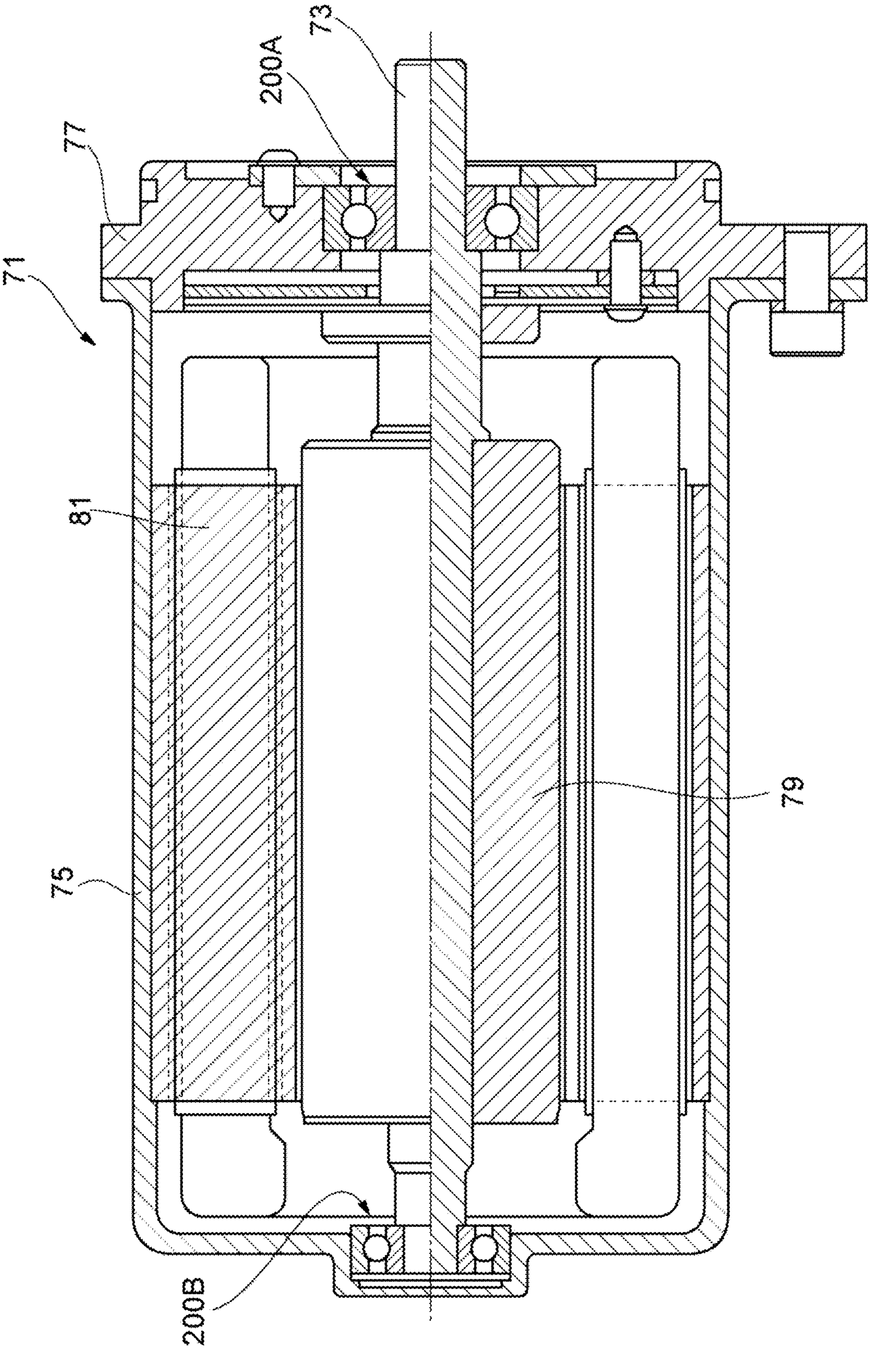
FIG. 12 is a schematic configuration diagram of a motor to which a bearing is applied.

Further, a bearing obtained by the manufacturing method for a ball bearing described above can be applied to, for example, bearings 200A and 200B that support a rotation shaft 73 of a motor 71 shown in FIG. 12. The motor 71 is a brushless motor and includes a center housing 75 having a cylindrical shape, and a front housing 77 having a substantially circular plate shape that closes one opening of the center housing 75. Inside the center housing 75, the rotatable rotation shaft 73 is supported along an axial center of the center housing 75 via the bearings 200A and 200B disposed at a bottom of the front housing 77 and the center housing 75. A motor-driving rotor 79 is provided around the rotation shaft 73, and a stator 81 is fixed to an inner peripheral surface of the center housing 75. The motor 71 configured as described above is generally mounted on a machine or vehicle, and rotates the rotation shaft 73 supported by the bearings 200A and 200B.

The above example is just one example, and as an example of application of the bearing, the bearing of this configuration can be suitably applied to a location where relative rotation occurs, which can lead to an improvement in product quality.

The present application is based on a Japanese Patent Application (No. 2022-098114) filed on Jun. 17, 2022, the contents of which are incorporated herein by reference.

REFERENCE SIGNS LIST

1 inner ring
3 outer ring
5 annular space
7 ball
9 ball bearing
17 workpiece holding table
18 inner ring moving mechanism
19 ball inserting portion
21 tilting operation mechanism
23 flow stop and block dividing mechanism
25 ball dividing portion
51 flow stop jig
52 block dividing jig
63 work arrow
71 motor
100 manufacturing device for ball bearing
200A, 200B bearing

The invention claimed is:

1. A manufacturing device for a ball bearing comprising:

a workpiece holding table configured to hold an inner ring and an outer ring with an annular space formed between the inner ring and the outer ring;

a ball inserting portion configured to load a plurality of balls in one region along a circumferential direction of the annular space formed between the inner ring and the outer ring held by the workpiece holding table;

a flow stop and block dividing mechanism configured to movably dispose a flow stop jig outside the one region of the annular space in the circumferential direction along an axial direction of the inner ring and the outer ring to keep the plurality of balls which have been loaded in the one region, and to movably dispose a block dividing jig along the axial direction of the inner ring and the outer ring to divide the plurality of balls into groups; and a ball dividing portion configured to, from a state in which the flow stop jig and the block dividing jig are disposed in the annular space, when the flow stop jig and the block dividing jig are removed from the annular space, sequentially insert tip ends of a plurality of work arrows protruded in accordance with the number of balls between the plurality of balls in an axial direction to arrange the plurality of balls at equal intervals in the circumferential direction, wherein at the same time as the moving of the block dividing jig along the axial direction, the flow stop jig is moved from the annular space in a removing direction such that the balls move in the circumferential direction while being sandwiched between the flow stop jig and the block dividing jig.

2. The manufacturing device for a ball bearing according to claim 1, further comprising:

an inner ring moving mechanism configured to move the inner ring to a side opposite to the one region with respect to the outer ring to expand the annular space in a radial direction in the one region.

3. The manufacturing device for a ball bearing according to claim 1, further comprising:

a tilting operation mechanism configured to tilt axial vertical surfaces of the inner ring and the outer ring held by the workpiece holding table.

4. The manufacturing device for a ball bearing according to claim 1, wherein the flow stop jig and the block dividing jig are formed in a plate shape that curves along the circumferential direction of the annular space and narrows along an insertion direction into the annular space.

5. The manufacturing device for a ball bearing according to claim 1, wherein the ball dividing portion includes a base portion formed in an annular shape, and a plurality of work arrows erected on the base portion and arranged at equal intervals in the circumferential direction, and the plurality of work arrows are arranged in a positional relationship symmetrical along the circumferential direction.

6. The manufacturing device for a ball bearing according to claim 5, wherein the plurality of work arrows include a reference work arrow and a plurality of other work arrows arranged in the circumferential direction, wherein the plurality of other work arrows include at least one work arrow having a maximum axial length, and wherein axial lengths of the plurality of other work arrows increase as respective circumferential distances from the reference work arrow increase from the reference work arrow toward the at least one work arrow having the maximum axial length, and decrease as the respective circumferential distances increase away from the at least one work arrow having the maximum axial length.

* * * * *